US012525676B2

(12) United States Patent
Bell et al.

(10) Patent No.: US 12,525,676 B2
(45) Date of Patent: Jan. 13, 2026

(54) SYSTEM FOR SECURING ENERGY STORAGE DEVICES

(71) Applicant: Caterpillar Inc., Peoria, IL (US)

(72) Inventors: Brian R. Bell, West Lafayette, IN (US); Adam R. Rosenberger, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 912 days.

(21) Appl. No.: 17/697,740

(22) Filed: Mar. 17, 2022

(65) Prior Publication Data

US 2023/0299407 A1 Sep. 21, 2023

(51) Int. Cl.
*H01M 50/244* (2021.01)
*H01M 50/204* (2021.01)
*H01M 50/242* (2021.01)
*H01M 50/264* (2021.01)
*H01M 50/291* (2021.01)

(52) U.S. Cl.
CPC ....... *H01M 50/244* (2021.01); *H01M 50/204* (2021.01); *H01M 50/242* (2021.01); *H01M 50/264* (2021.01); *H01M 50/291* (2021.01)

(58) Field of Classification Search
CPC ............. H01M 50/244; H01M 50/204; H01M 50/242; H01M 50/264; H01M 50/291; Y02E 60/10
See application file for complete search history.

(56) References Cited

U.S. PATENT DOCUMENTS

| | | | |
|---|---|---|---|
| 8,708,433 B2 | 4/2014 | Ahlgrim et al. | |
| 9,455,427 B2 | 9/2016 | Michelitsch | |
| 10,364,728 B2 | 7/2019 | Chenoweth | |
| 11,121,426 B2 | 9/2021 | Koetting et al. | |
| 2015/0079451 A1* | 3/2015 | Jeong | H01M 50/50 429/151 |
| 2021/0288298 A1* | 9/2021 | Ramadan | B60L 58/26 |

FOREIGN PATENT DOCUMENTS

| | | |
|---|---|---|
| JP | 2013122819 | 6/2013 |
| JP | 2018106836 | 7/2018 |

* cited by examiner

*Primary Examiner* — Kiran Quraishi Akhtar
(74) *Attorney, Agent, or Firm* — Lee & Hayes, PLLC

(57) ABSTRACT

An example system includes a base having a surface and a post coupled to the base and extending in a first direction that is transverse to the surface of the base. The system further includes a battery module having a housing supported by the base and defining an internal space, the housing being configured to secure one or more battery cells within the internal space. The housing of the battery module includes an end plate extending in the first direction, and a receiver formed in the end plate and defining a hollow portion in the end plate, wherein the post extends at least partly within the receiver and is coupled to the receiver.

20 Claims, 8 Drawing Sheets

SYSTEM FOR SECURING ENERGY STORAGE DEVICES

TECHNICAL FIELD

The present disclosure relates to a system for securing energy storage devices. More specifically, the present disclosure relates to a modular system that secures battery storage devices in a variety of configurations.

BACKGROUND

Energy storage devices such as batteries or battery modules (e.g., a structure including multiple battery cells that are electrically connected and encased in a housing) are used in a variety of applications in order to provide and/or store energy. For example, in some applications, battery modules receive and store electricity generated by wind turbines, photovoltaic modules, or other energy generating devices or systems. Furthermore, in some applications, battery modules can supply energy as an alternative energy source and/or supplement electricity that is provided via a grid system, generator set, or other system.

Battery racks are often used to store battery modules. However, battery racks typically include large structures that are bulky and heavy in order to accommodate the weight of multiple battery modules secured in the battery racks. These large structures can reduce available energy storage space. Furthermore, such structures can be difficult to reconfigure to accommodate a number of battery modules stored therein. As such, battery racks often include a fixed capacity for storing battery modules. In addition, such battery racks often lack the necessary structural strength to handle vibration or other forces experienced during transportation. As such, transporting known battery racks can damage the battery racks themselves, damage the individual battery modules stored within the battery racks, and/or can create potential safety issues if the stored battery modules become dislodged during transportation.

In mobile applications, battery modules are often stored in primarily horizontal orientations. For example, in passenger vehicles, battery modules are often stored under a passenger compartment of the vehicle where space is readily available. However, in some applications, it can be preferable to store battery modules vertically (e.g., stacked on each other) in order to reduce an amount of surface area required to store the battery modules.

An example battery module storage system is described in U.S. Pat. No. 9,455,427 (hereinafter referred to as "the '427 reference"). In particular, the '427 reference describes a plate-shaped intermediate element that is placed between adjacent battery modules. The plate-shaped intermediate element includes elastic ribs, which allow the battery modules to expand during use. The '427 reference also describes that multiple battery modules can be assembled in a modular manner using the fastening elements and connecting elements described therein. Such fastening and connecting elements allow the battery modules to expand and contract during use of the battery modules. However, the '427 reference describes that such a battery module storage system is coupled to two longitudinal beams of a vehicle. As such, the battery module storage system, described in the '427 reference, ideally stores the battery modules in a substantially horizontal configuration. Thus, the battery module storage system described in the '427 reference requires a significant amount of surface in order to store the battery modules. Furthermore, the battery module storage system, described in the '427 reference, is ill-suited for stacking battery modules vertically as the battery module storage system lacks a structure to carry a weight of the battery modules if the battery modules were stacked vertically.

Example embodiments of the present disclosure are directed toward overcoming the deficiencies described above.

SUMMARY

An example system includes a base having a surface and a post coupled to the base and extending in a first direction that is transverse to the surface of the base. The system further includes a battery module having a housing supported by the base and defining an internal space, the housing being configured to secure one or more battery cells within the internal space. The housing of the battery module includes an end plate extending in the first direction, and a receiver formed in the end plate and defining a hollow portion in the end plate, wherein the post extends at least partly within the receiver and is coupled to the receiver.

An example system includes a first battery module having a first housing that includes a first end plate, a first receiver disposed proximate the first end plate, and a second receiver disposed proximate the first end plate. The system a second battery module disposed vertically above the first battery module, the second battery module having a second end plate defining an end of the second housing, a third receiver disposed proximate the second end plate, and a fourth receiver disposed proximate the second end plate. The system also includes a first plate having a first crossmember, a first extension extending from a first side of the first crossmember, and a second extension extending from a second side of the first crossmember, the first extension of the first plate being disposed at least partially within the third receiver and the second extension of the first plate being disposed at least partially within the first receiver. The system further includes a second plate having a second crossmember, a first extension extending from a first side of the second crossmember, and a second extension extending from a second side of the second crossmember, the first extension of the second plate is disposed at least partially within the fourth receiver and the second extension of the second plate being disposed at least partially within the second receiver such that the second housing is supported at least partially by the first crossmember of the first plate and the second crossmember of the second plate.

In a further example, a method of configuring a battery module system includes providing a base having a plurality of vertically extending posts, and providing a battery module that includes a housing having an end plate with a vertically extending receiver formed in the end plate, the receiver defining a hollow portion. The method further includes securing the battery module to the base such that at least a portion of the post is disposed within the receiver and is coupled to the receiver.

DETAILED DESCRIPTION

Figure 1:
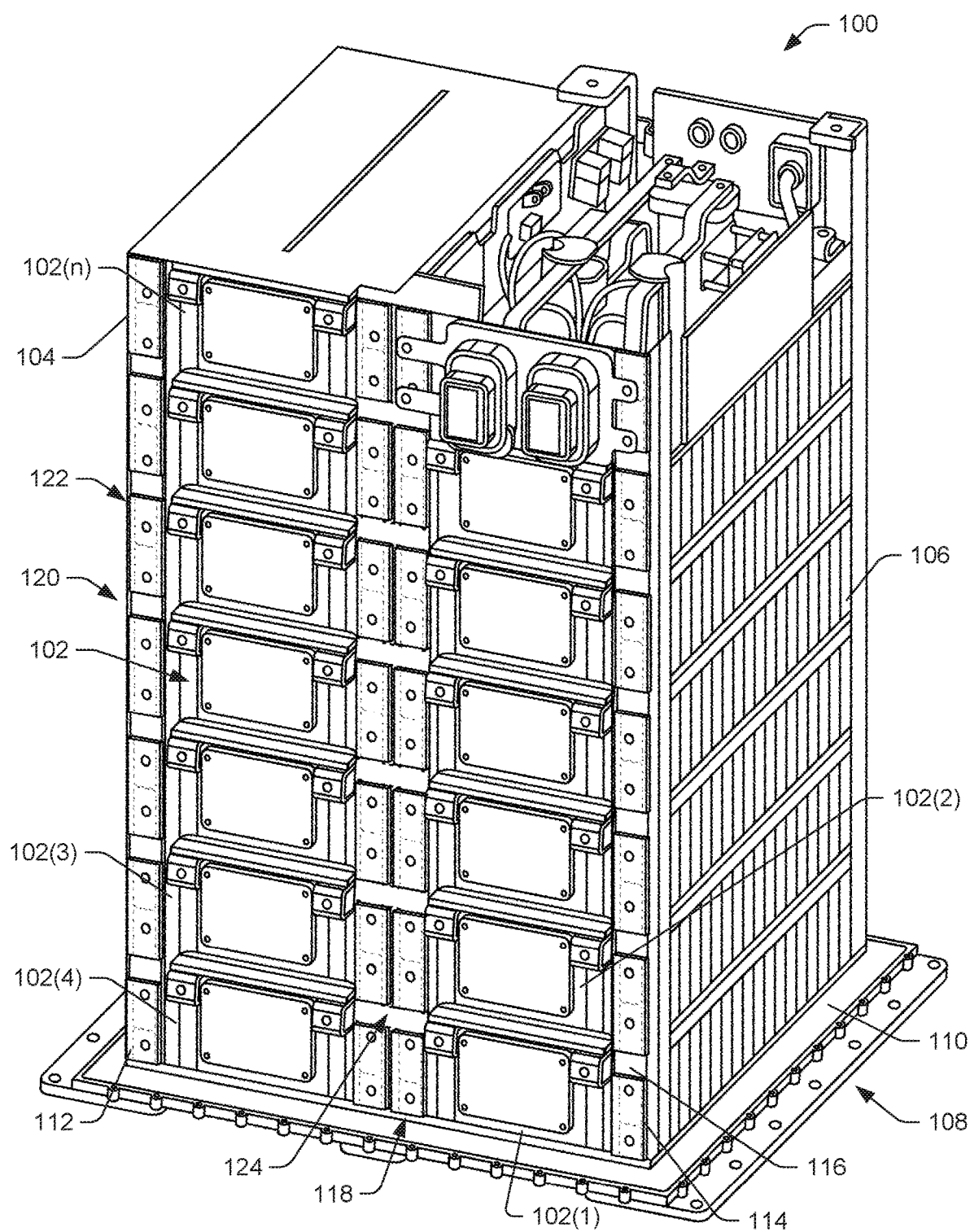
FIG. 1 is a perspective view of an example system for configuring battery modules in accordance with an example of the present disclosure and with certain components removed for clarity.

FIG. 1 depicts a perspective view of an example system 100 for configuring one or more battery modules 102. In some examples, individual battery modules 102 include a housing 104 that encases multiple battery cells 106 within the battery module 102. The system 100 described herein uses the housing 104 (further illustrated in FIG. 3) of the battery modules 102 as part of the system 100 for securing the battery modules 102, which reduces and/or eliminates a need for an external "battery rack" structure. As such, storage space may be increased, improving an energy density of the system 100. Furthermore, the system 100 is easily reconfigurable to include any number of battery modules 102 in any arrangement to meet necessary energy storage and/or input/output requirements, as well as ensuring that the system 100 fits within available space in any given application. While FIG. 1 depicts the system 100 including fourteen battery modules 102 arranged in seven rows and two columns (e.g., 7×2), it is to be understood that the system 100 may include any number of battery modules 102 arranged in an m×n configuration, where m is the number of rows and n is the number of columns.

The battery modules 102 each include a number of battery cells 106 disposed within the housing 104 of individual battery modules 102. It is to be noted that a portion (e.g., a side plate 224) of the housing 104 is not shown in FIG. 1 in order to illustrate the battery cells 106 within the housing 104. The housing 104 of the battery modules 102 is shown and described further herein with respect to FIG. 2. In some examples, the battery cells 106 are lithium ion battery cells. For example, the battery cells 106 may be lithium cobalt oxide, lithium manganese oxide, lithium nickel manganese cobalt oxide, lithium iron phosphate, lithium nickel cobalt aluminum oxide, lithium titanate, or other type of battery cells 106. The battery modules 102 may provide support for the battery cells 106, cooling structure to provide airflow for the battery cells 106, electrical connectivity between the battery cells 106, communication between the battery cells 106, etc. The type, size, capacity, quantity, or other parameters of the battery cells 106 may be selected based on specific power and energy requirements of the application for which the battery modules 102 and the system 100 are to be used. In some examples, an individual battery module 102 may include any number of battery cells 106 disposed therein. For example, a single battery module 102 may include between 4 and 20 battery cells 106 disposed within a housing 104 of the battery module 102. However, it is to be understood that the battery modules 102 may include fewer than or more than the number of battery cells 106 described herein.

In some examples, the system 100 may include a base 108. The base 108 of the system 100 may include a substantially flat (e.g., substantially planar) surface 110 on which the battery modules 102 may be arranged and/or stacked. However, in some examples, the surface 110 may be omitted and the base 108 may be a substantially rectangular frame having posts (described further herein below) extending from the base 108. In some examples, the base 108 of the system 100 may be disposed on and/or coupled to a secondary structure such as a trailer, container, or other secondary structure. Alternatively, the base 108 of the system 100 may be disposed on a surface of the ground. Still further, in some examples, the base 108 may be omitted and the battery modules 102 may be disposed on and/or coupled to a secondary structure such as a trailer, container, or other secondary structure. In some examples, the base 108 includes one or more vertical posts 112 coupled to the base 108 and extending from the base 108 in a direction that is transverse to the surface 110 of the base 108 (e.g., the posts 112 extend vertically from the base 108). The base 108, the posts 112, and components thereof, may be made from various types of metals and/or alloys including, but not limited to, steel, aluminium, titanium, or other suitable materials. The base 108 and the components thereof will be shown and described further herein with respect to FIG. 3.

As mentioned previously, the system 100 includes a plurality of battery modules 102 arranged within the system 100 and supported by the system 100. In some examples, the housings 104 of respective battery modules 102 include one or more receivers 114 formed in the housing 104 (or coupled thereto). For example, the housing 104 of the first battery module 102(1) includes at least one receiver 114 configured to receive a post 112 of the base 108 at least partially within the receiver 114. The receiver 114 may be formed from a vertical hollow portion (e.g., an elongated opening) formed in the housing 104 of the battery module 102. As shown in FIG. 1, the housing 104 may include a first receiver 114(1) and a second receiver 114(2). The first receiver 114(1) and the second receiver 114(2) are sized such that each of the first receiver 114(1) and the second receiver 114(2) are configured to receive at least a portion of a post 112 of the base 108 therein. In some examples, the battery module 102 may be coupled to the posts 112 of the base 108 via fasteners that are inserted through apertures formed in the receivers 114 and secured within threaded apertures in the posts 112, as will be shown and described further herein with respect to FIG. 3. It is noted that each of the battery modules 102 in the system 100 may include a similar housing 104 having at least one receiver 114 formed therein.

The system 100 further includes one or more connecting plates 116 that are coupled to the battery modules 102 to connect the battery modules 102 to each other. For example, the connecting plates 116 may be disposed at least partially within the receivers 114 of the battery modules 102 and may be coupled to the battery modules 102. The connecting plates 116 of the system 100 comprise a substantially rigid component formed from a metallic material (or other rigid or semi-rigid material) such as steel, stainless steel, aluminum, titanium, or other material. The connecting plates 116 may be inserted within receivers 114 of the battery modules 102 and are coupled to the battery modules 102 to form a connection and support system to secure the battery modules 102 within the system 100. For example, the connecting plates 116 may be inserted within the receivers 114 of the battery modules 102 and may abut each other and/or the posts 112 of the base 108. Such a configuration creates vertical columns 118 of connecting plates 116 and posts 112 that connect the battery modules 102 and support vertically stacked battery modules 102. The connecting plates 116 also align receivers 114 of the battery modules 102 such that the battery modules 102 are aligned when vertically stacked.

In some examples, the connecting plates 116 of the system 100 engage with the receivers 114 of the battery modules 102 which provides modularity to the system 100. For example, the system 100 may include any number of battery modules 102 that may be configured and connected to each other via the connecting plates 116 that engage with the receivers 114. In some examples, the battery modules 102 may rest on individual connecting plates 116. As mentioned previously, the configuration of connecting plates 116 and posts 112 may abut one another to form a vertical column 118 that is configured to connect the battery modules 102 and support a weight of vertically stacked battery modules 102. As such, the connecting plates 116 may connect and support the battery modules 102. Furthermore, the system 100 may include a configuration that connects horizontally adjacent battery modules 102. For example, the system 100 may include connecting plates 116 that are configured to span a distance between horizontally adjacent battery modules 102.

Such configurations may reduce and/or eliminate a need for a battery rack structure and may, therefore, increase storage capacity of the system 100 and increase the energy density of the system 100. Furthermore, the system 100 may be configured with any number of battery modules 102 without wasting storage space since the receivers 114 and the connecting plates 116 may be configured to accommodate the number of battery modules 102 configured within the system 100. These configurations, including the individual components of the system 100, are shown and described further herein.

Figure 2:
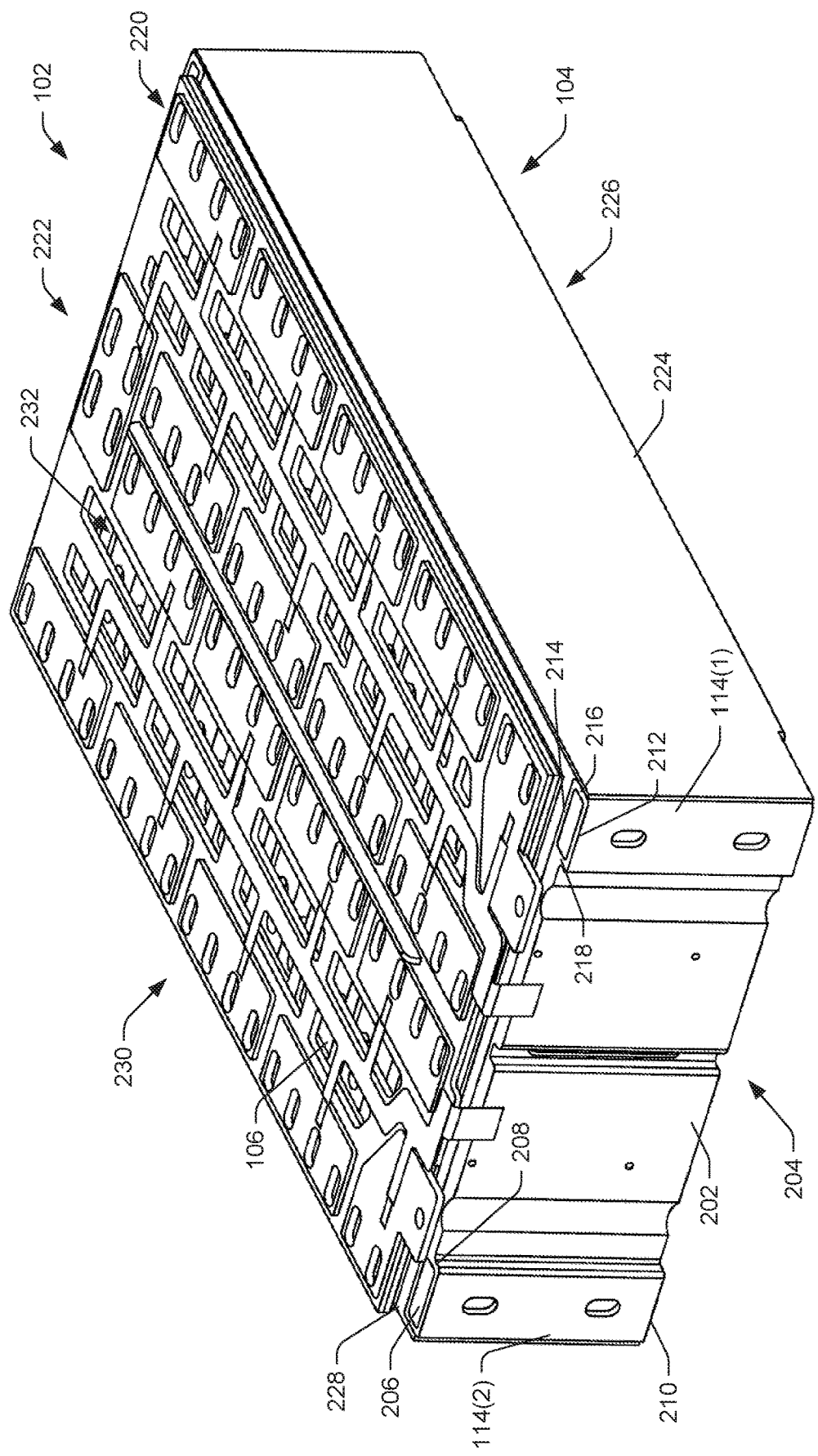
FIG. 2 is a perspective view of an example housing for a battery module, in accordance with an example of the present disclosure.

FIG. 2 depicts a perspective view of a battery module 102 of the system 100, as shown and described previously. As mentioned previously, the battery module 102 includes a housing 104. In some examples, the housing 104 includes a first end plate 202 that defines a first end 204 of the housing 104. The first end plate 202 may be made from various types of metals and/or alloys including, but not limited to, steel, aluminium, titanium, or other suitable materials. The first end plate 202 includes at least one receiver 114 formed therein. In some examples, the first end plate 202 includes a first receiver 114(1) and a second receiver 114(2) (collectively "the receivers 114") formed therein. As mentioned previously, the receivers 114 include and/or otherwise define a hollow portion 206 formed in the first end plate 202 and extending from a top surface 208 of the receiver 114 to a bottom surface 210 of the receiver 114 opposite the top surface 208. Alternatively, in some examples, the hollow portion 206 may not be continuous between the top surface 208 and the bottom surface 210. For example, the receiver 114 may be include elongated openings formed in the top surface 208 and the bottom surface 210 that are shaped to receive the post 112 and/or the connecting plates 116 therein.

In some examples, the receivers 114 include a front wall 212 and a back wall 214 horizontally opposite the front wall 212. The receivers 114 further include a first side wall 216 extending between the front wall 212 and the back wall 214 and a second side wall 218 extending between the front wall 212 and the back wall 214, the second side wall 218 disposed opposite the first side wall 216. The front wall 212, the back wall 214, the first side wall 216, and the second side wall 218 may form an enclosed channel forming the hollow portion 206 that is shaped to receive the receivers 114 within the hollow portion 206.

While the receivers 114 are described as being formed in the end plates (e.g., the first end plate 202 and the second end plate 220) of the housing 104, the receivers 114 may instead be formed in the side plates (e.g., the first side plate 224 and the second side plate 228) of the housing 104. Furthermore, in some examples, the receivers 114 may be disposed on and/or proximate to the end plates (e.g., the first side plate 224 and the second side plate 228) of the housing 104. Still further, in some examples, the receivers 114 may be separate hollow beams (or partially hollow beams, beams having an elongated opening, etc.) that are coupled to the housing 104. For example, the receivers 114 may include hollow beams that are welded, fastened, or otherwise coupled to the end plates (e.g., the first end plate 202 and the second end plate 220) or other portion of the housing 104.

The housing 104 also includes a second end plate 220 that defines a second end 222 of the housing 104. The second end plate 220 may be made from various types of metals and/or alloys including, but not limited to, steel, aluminium, titanium, or other suitable materials. In some examples, the second end plate 220 is parallel to the first end plate 202. Furthermore, in some examples, the second end plate 220 and the first end plate 202 are identical components such that the second end plate 220 and the first end plate 202 include the same features and/or components. For examples, the second end plate 220 may also include receivers 114 formed in (or coupled to) the second end plate 220. Furthermore, the second end plate 220 may be identical in size to the first end plate 202. In some examples, the second end plate 220 may be spaced apart from the first end plate 202 by a distance that may be determined based on a number of battery cells 106 that are accommodated between the first end plate 202 and the second end plate 220.

In some examples, the housing 104 also includes a first side plate 224. The first side plate 224 extends from the first end plate 202 to the second end plate 220, thereby defining a first side 226 of the housing 104. The first side plate 224 is coupled to the first end plate 202 at the first end 204 of the housing 104, and is coupled to the second end plate 220 at the second end 222 of the housing 104, such that the first side plate 224 spans a distance between the first end plate 202 and the second end plate 220. The first side plate 224 may be made from various types of metals and/or alloys including, but not limited to, steel, aluminium, titanium, or other suitable materials. In some examples, the material of the first side plate 224 is the same or substantially similar to the material of the first end plate 202 and the second end plate 220.

The housing 104 further includes a second side plate 228. The second side plate 228 extends from the first end plate 202 to the second end plate 220, thereby defining a second side 230 of the housing. The second side plate 228 is coupled to the first end plate 202 at the first end 204 of the housing 104 and is coupled to the second end plate 220 at the second end 222 of the housing 104, such that the second side plate 228 spans a distance between the first end plate 202 and the second end plate 220. The second plate 228 may be substantially parallel to the first side plate 224. In some examples, the second end plate 228 and the first side plate 224 are identical components such that the second end plate 228 includes the same features as the first side plate 224. Furthermore, the second end plate 228 may be identical in size to the first side plate 224.

In some examples, the first end plate 202, the second end plate 220, the first side plate 224, and the second side plate 228 are coupled to one another such that the first end plate 202, the second end plate 220, the first side plate 224, and the second side plate 228 define an exterior perimeter, forming an internal space 232 of the housing 104, the battery cells 106 being secured within the internal space 232 of the housing 104. Additionally, the first end plate 202, the second end plate 220, the first side plate 224, and the second side plate 228 each include a substantially equal height. Furthermore, in some examples, the first end plate 202, the second end plate 220, the first side plate 224, and the second side plate 228 are welded to one another in order to eliminate the need for fasteners, thereby eliminating clearance requirements for the fasteners and tools to adjust the fasteners. As such, the housing 104 described herein maximizes space available for positioning battery cells 106 therein, while minimizing space that may be taken up by fasteners, or other coupling devices.

Figure 3:
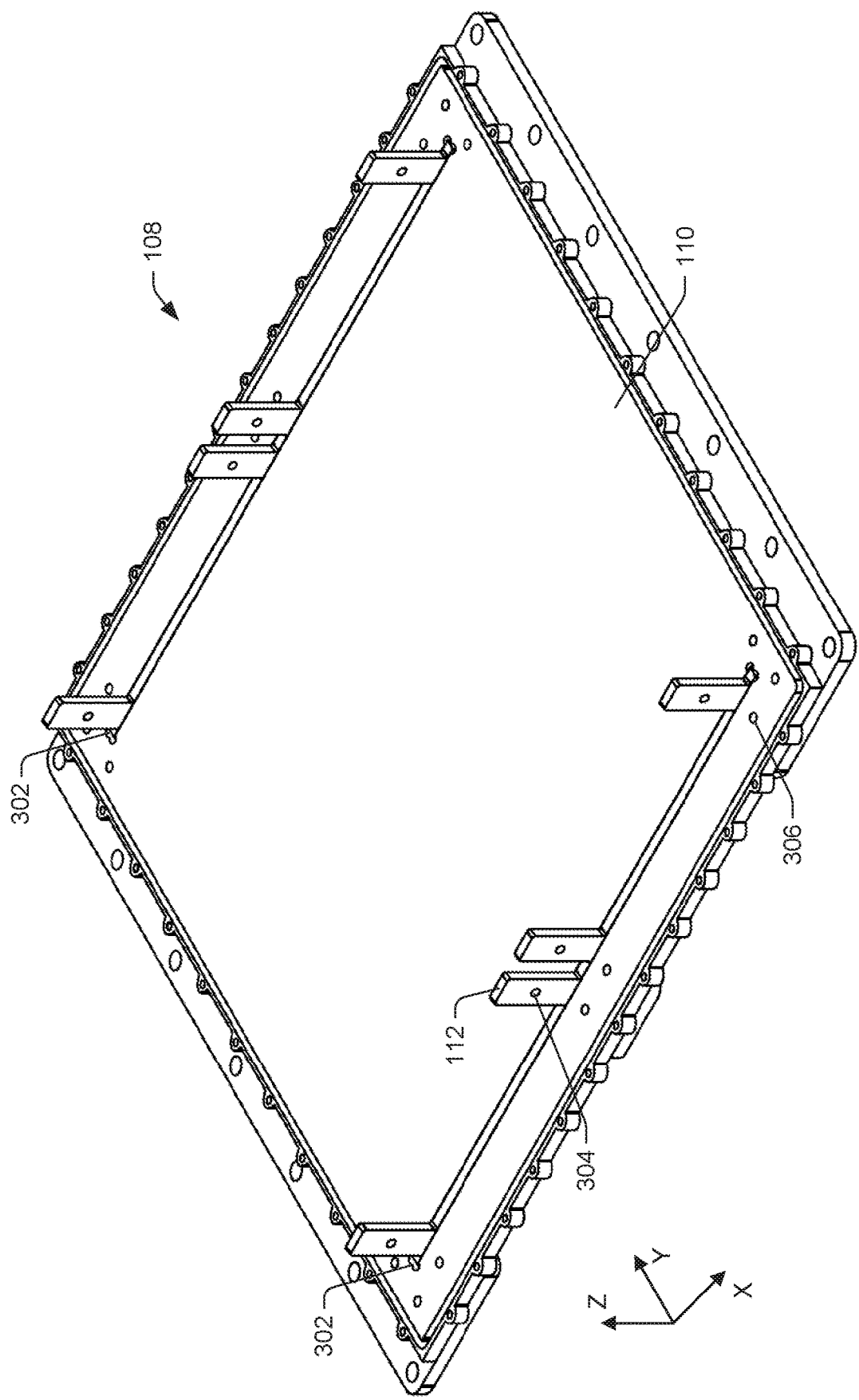
FIG. 3 is a perspective view of a base of the example system for configuring battery modules illustrated in FIG. 1, in accordance with an example of the present disclosure.

FIG. 3 depicts a perspective view of the base 108 of the system 100. As mentioned previously, the base 108 of the system 100 includes a substantially planar (e.g., substantially flat) surface 110 on which the battery modules 102 are arranged and/or stacked. As shown in FIG. 2, the surface 110 of the base 108 extends in the X- and Y-directions (e.g., horizontally). The base 108 of the system 100 provides a support structure that supports a weight of the battery modules 102 mounted thereon. The base 108 of the system 100 may be sized to accommodate any number of battery modules 102 arranged in any m×n configuration.

The base 108 includes posts 112 extending from the surface 110 of the base 108. In some examples, the posts 112 are coupled to the base 108 and extend in a direction that is transverse to the surface 110 of the base 108. As shown in FIG. 2, the posts 112 extend in the Z-direction which is substantially perpendicular to the X- and Y-directions. In some examples, the base 108 includes one or more slots 302 formed in the surface 110 of the base 108. The slots 302 may be machined in the surface 110 of the base 108 and may be sized to receive the posts 112 therein. Once disposed within the slots 302, the posts 112 are coupled to the base 108. For example, the posts 112 may be placed in the slots 302 and welded to the base 108. However, the posts 112 may be coupled to the base 108 via fasteners.

As mentioned previously, the first end plate 202 and the second end plate 220 may each include at least one receiver 114 formed in respective end plates. As such, the base 108 includes two slots 302 formed in the surface 110 of the base 108. The slots 302 may extend in the Y-axis and may be parallel to each other. As such, the posts 112 disposed in the slots 302 may also be substantially parallel to each other. The battery modules 102 are disposed on the base 108 such that the posts 112 of the base 108 are at least partially disposed within the receivers 114 of the battery modules 102.

As shown in FIG. 2, each of the posts 112 may include at least one aperture 304 formed in a portion of the posts 112. The aperture 304 formed in the post 112 may be a threaded aperture that is configured to receive threading of a fastener therein. For example, and as shown and described with respect to FIG. 6 a fastener 604 may be inserted through an aperture in a receiver 114 of a battery module 102 and may be coupled to the post 112 via the threaded aperture 304 in the post 112. The system 100 further includes apertures 306 formed in the surface 110 of the base 108. The apertures 306 formed in the surface 110 of the base 108 may allow components of the system 100 to be coupled to the base 108. For example, and as shown and described with respect to FIG. 8, one or more vertical braces 802 may be coupled to the surface 110 of the base 108. The braces 802 may also be coupled to the battery modules 102 disposed on the base 108 and may provide additional strength to the system 100. In some examples, the braces may be coupled to the base 108 and the battery modules 102 when the system 100 is transported in order to provide additional strength to the system 100 that may be subject to vibration, jostling, or other types of forces experienced during transportation. The apertures 306 formed in the base 108 may also include threading configured to engage threading of fasteners secured within the apertures 306.

Figure 4:
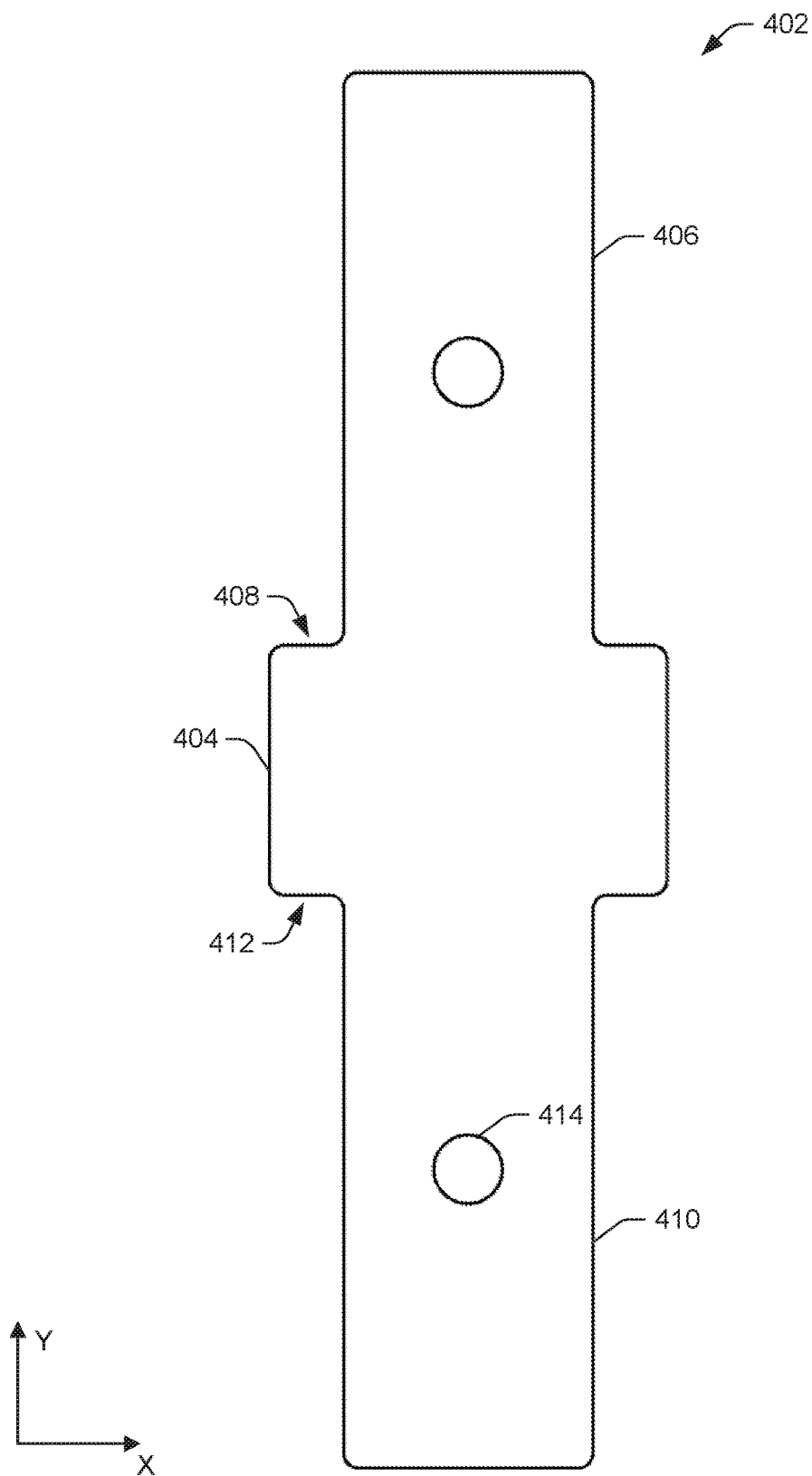
FIG. 4 is a front view of an example connecting plate of the example system for configuring battery modules illustrated in FIG. 1, in accordance with an example of the present disclosure.

FIG. 4 depicts a front view of an example connecting plate 116 of the system 100 shown and described in FIG. 1. Various components and/or features described with respect to FIG. 4 may be shown in other figures shown and described herein. The connecting plates 116 shown in FIG. 1 may include a first type of connecting plate, which is referred to herein below as an "I-plate 402" as the first type of connecting plate may be substantially I-shaped. The I-plate 402 may be used in the system 100 for end-most connections 120 (shown in FIG. 1), which refers to connections between battery modules 102 proximate a horizontal end 122 (shown in FIG. 1) of the system 100.

In some examples, the I-plate 402 is a substantially I-shaped plate. For example, the I-plate 402 includes a relatively short or narrow crossmember 404. The crossmember 404 of the I-plate 402 extends along the X-direction (e.g., in a substantially horizontal direction when the I-plate 402 is being used in the system 100). The I-plate 402 also includes a first leg or extension 406 extending from a first side 408 of the crossmember 404 and a second leg or extension 410 extending from a second side 412 of the crossmember 404, where the second side 412 is opposite the first side 408. In some examples, the first extension 406 and the second extension 410 include an aperture 414 that is sized to receive a fastener 604 therein. The first extension 406 and the second extension 410 extend along a central axis of the I-plate 402 in the Y-direction (e.g., in a substantially vertical direction).

Figure 7:
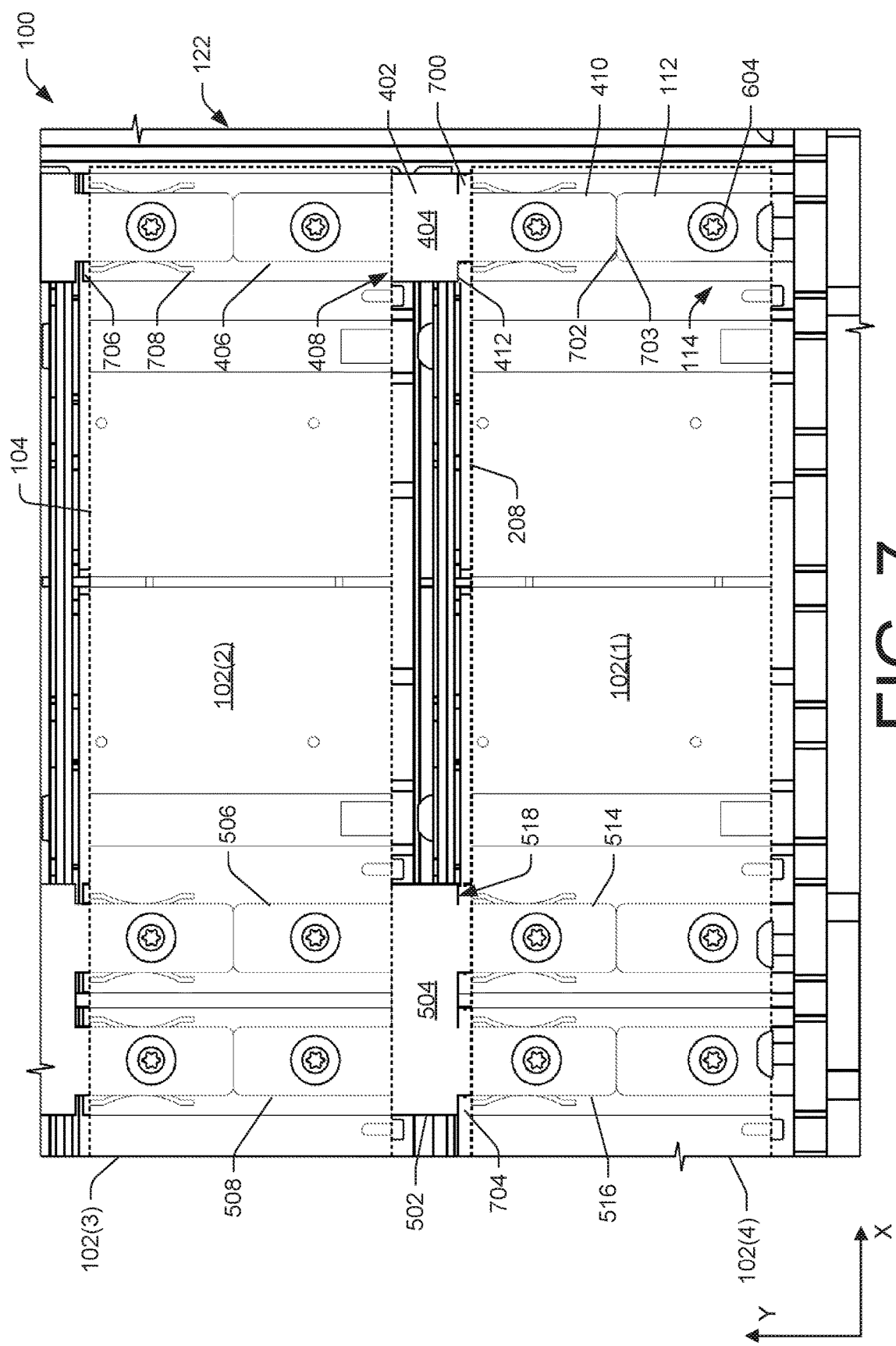
FIG. 7 is a front view of the example system for configuring battery modules illustrated in FIG. 1, in accordance with an example of the present disclosure.

When the system 100 includes two battery modules 102(1), 102(2) stacked vertically, the first extension 406 is received within the receiver 114 of the upper module (e.g., 102(2)) and the second extension 410 is received within the receiver 114 of the lower module (e.g., 102(1)). In such a configuration, the housing 104 of the second battery module 102(2) rests on the first (or upper in FIG. 4) side 408 of the crossmember 404 of the I-plate 402 (shown and described further herein with respect to FIG. 7. Furthermore, the I-plate 402 may be positioned and/or sized such that a gap 700 (also (shown and described further herein with respect to FIG. 7 is formed between the second side 412 of the crossmember 404 and the top surface 208 of the housing 104 of the first battery module 102(1). As such, a weight of the second battery module 102(2) rests on the first side 408 of the crossmember 404 which transfers at least a portion of the weight of the battery module 102 to the I-plate 402, which, in turn, transfers the weight to the base 108 via the post 112. Such a configuration is maintained throughout the system 100 in order to carry the weight of the battery modules 102 through the connecting plates 116 (including the I-plate 402)

and the posts 112 to the base 108 of the system 100, instead of carrying the weight through the battery modules 102 themselves.

Figure 5:
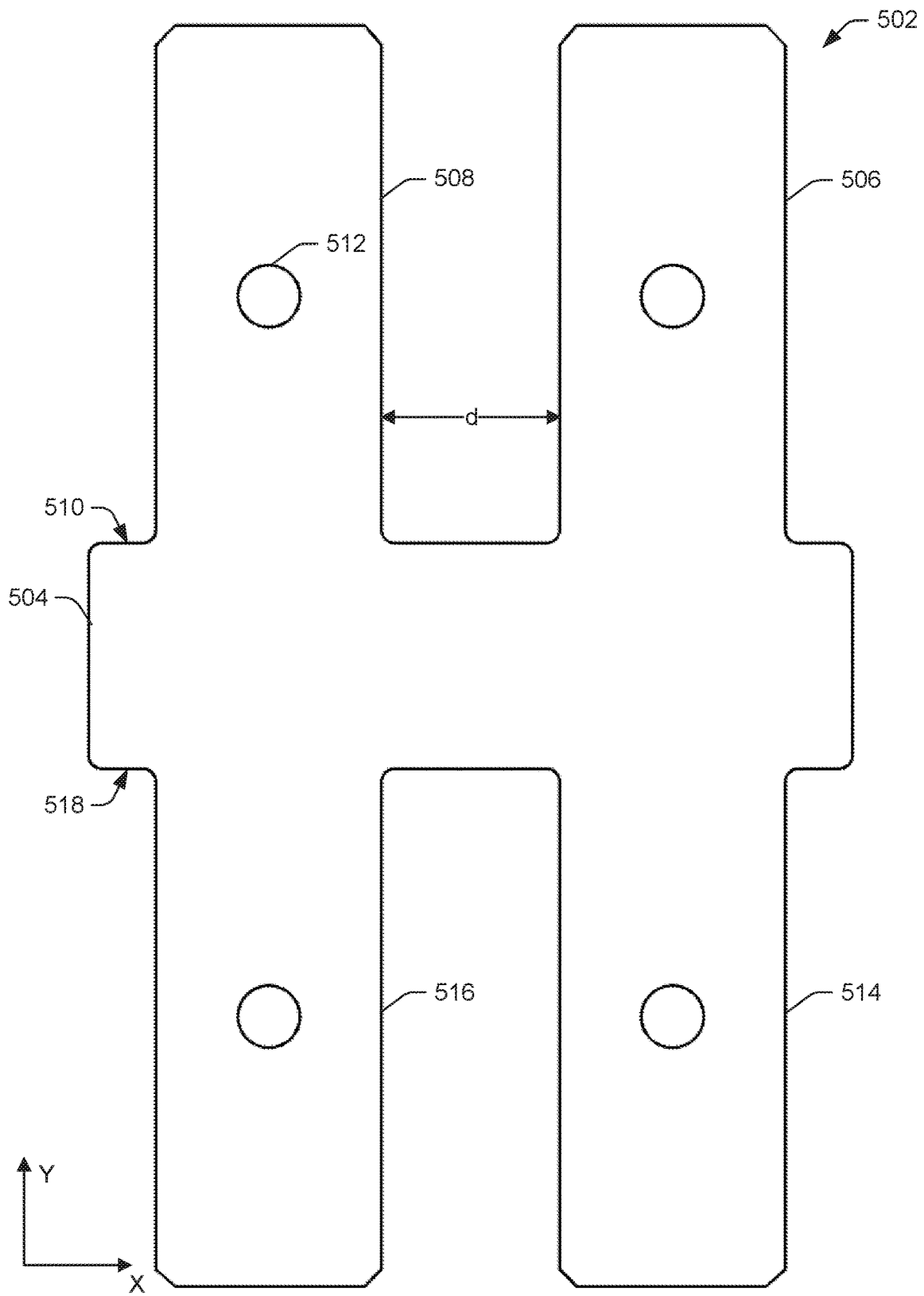
FIG. 5 is a front view of another example connecting plate of the example system for configuring battery modules illustrated in FIG. 1, in accordance with an example of the present disclosure.

FIG. 5 depicts a front view of an example connecting plate 116 of the system 100 shown and described in FIG. 1. Various components and/or features described with respect to FIG. 5 may be shown in other figures shown and described herein. The connecting plates 116 shown in FIG. 1 may include a second type of connecting plate, which is referred to herein as an "H-plate 502" as the second type of plate may be substantially H-shaped. The H-plate 502 may be used in the system 100 for internal connections 124, wherein "internal connections" refers to connection formed between ends of battery modules 102 or between horizontally adjacent battery modules 102. In some examples, the internal connections 124 may be formed from four battery modules 102 where two horizontally adjacent battery modules (e.g., 102(1) and 102(4)) include two horizontally adjacent battery modules (e.g., 102(2) and 102(3)) stacked thereon.

The H-plate 502 includes a relatively long or wide crossmember 504, as compared to the crossmember 404 of the I-plate 402. The crossmember 504 of the H-plate 502 extends along the X-direction (e.g., in a substantially horizontal direction when the H-plate 502 is being used in the system 100). The crossmember 504 of the H-plate 502 is sized in order to span a distance between adjacent battery modules 102 to permit horizontal interconnection between the adjacent battery modules 102, which may strengthen the system 100 against slip, torsional, or other forces that may be applied to the battery modules. As such, the crossmember 504 may strengthen the system against such forces.

The H-plate 502 also includes a first extension or leg 506 and a second extension or leg 508 extending from a first side 510 of the crossmember 504. The first extension 506 and the second extension 508 extend in a parallel direction along the Y-axis (e.g., in a substantially vertical direction). In some examples, the first extension 506 and the second extension 508 are spaced apart by a distance "d". The first extension 506 and the second extension 508 are spaced apart by the distance "d" based on a desired distance between horizontally adjacent battery modules 102. In some examples, the first extension 506 and the second extension 508 each include an aperture 512 formed therein that is sized to receive a fastener 604 therein.

The H-plate 502 further includes a third extension or leg 514 and a fourth extension or leg 516 extending from a second side 518 of the crossmember 504. The third extension 514 and the fourth extension 516 extend in a parallel direction along the Y-axis (e.g., in a substantially vertical direction). The third extension 514 and the fourth extension 516 are spaced apart by the distance "d." In some examples, the distance "d" between the first extension 506 and the second extension 506 and the distance between the third extension 514 and the fourth extension 516 may be substantially the same. In some examples, the third extension 514 and the fourth extension 516 may each include an aperture 512 formed therein that is sized to receive a fastener 604 therein.

When the system 100 includes the second battery module 102(2) stacked vertically above the first battery module 102(1) and a third battery module 102(3) stacked vertically above a fourth battery module 102(4), where the second battery module 102(2) and the third battery module 102(3) are horizontally adjacent (as shown in FIG. 1), the first extension 506 is disposed at least partially within a receiver 114 of the second battery module 102(2), and the second extension 508 is disposed at least partially within a receiver 114 of the third battery module 102(3). Meanwhile, the third extension 514 is disposed at least partially within a receiver of the first battery module 102(1), and the fourth extension 516 is disposed at least partially within a receiver of the fourth battery module 102(4). In such a configuration, the housings 104 of the second battery module 102(2) and the third battery module 102(3) rest on and are supported at least partially by the first (or upper in FIG. 5) side 510 crossmember 504 of the H-plate 502 (shown and described further herein with respect to FIG. 7.

Furthermore, the H-plate 502 is positioned and/or sized such that a gap 704 (shown and described further herein with respect to FIG. 7 is formed between the second side 518 of the crossmember 504 and the top surface 208 of the respective housings 104 of the first battery module 102(1) and the fourth battery module 102(4). As such, a weight of the upper battery modules (e.g., the second battery module 102(2) and the third battery module 102(3)) is supported at least in part by the H-plate 502 which transfers the weight to the base 108 via the posts 112 of the base 108. Such a configuration is maintained throughout the system 100 in order to carry the weight of the battery modules 102 through the connecting plates 116 (including the I-plates 402 and the H-plates 502) and the posts 112 to the base 108 of the system 100, instead of carrying the weight through the battery modules 102 themselves.

Figure 6:
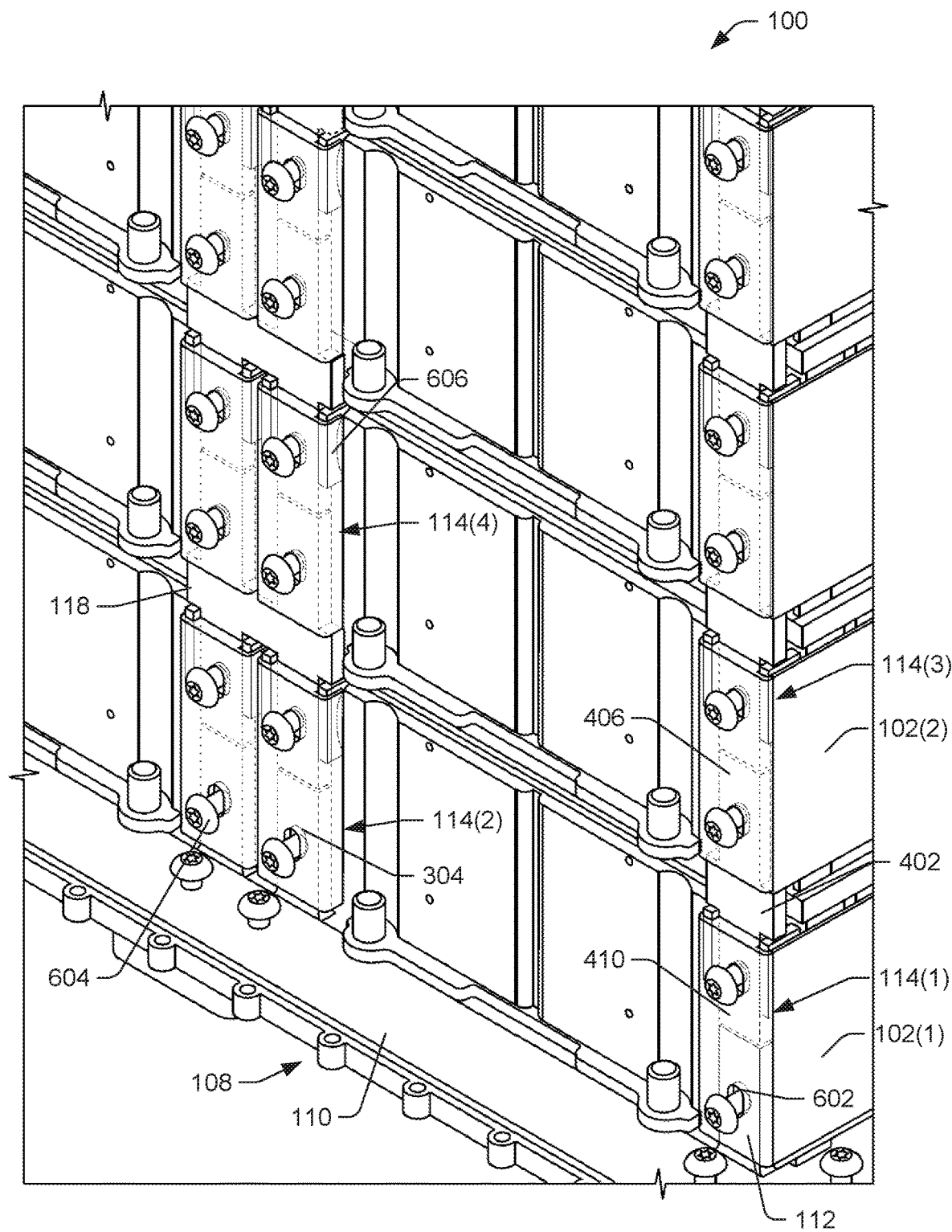
FIG. 6 is another perspective view of the example system for configuring battery modules illustrated in FIG. 1, in accordance with an example of the present disclosure.

FIG. 6 depicts an enlarged perspective view of a portion of the system 100 shown and described in FIG. 1. As mentioned previously, the system 100 includes a first battery module 102(1) disposed on the surface 110 of the base 108. As mentioned previously, the battery modules 102 include a first receiver 114(1) and a second receiver 114(2) formed in each end plate (e.g., first end plate 202 and second end plate 220) shaped to receive a post 112 of the base 108 therein. Thus, the battery modules 102 may include four receivers 114 formed in the housing 104 of the battery modules 102.

The receivers 114 of the battery module 102 may receive respective posts 112 of the base therein such that the first battery module 102(1) is supported by the base 108 with the posts 112 being disposed at least partially within the receivers 114. As mentioned previously, the receivers 114 may include apertures 602 formed therein. In some examples, the apertures 602 may be sized in order to allow a fastener 604 to be inserted through the aperture 602 without requiring the fastener 604 to engage the aperture 602 in the receiver 114. Instead, the fastener 604 may be inserted through the aperture 602 in the receiver 114 and may engage the aperture 304 in the post 112. As such, the post 112 may be coupled to the receiver 114 via the fastener 604. However, in some examples, the fastener 604 may engage the aperture 602 in the receiver 114 and the aperture 304 in the post 112. In either example, a fastener 604 is secured within the aperture 304 in the post 112, thereby securing the first battery module 102(1) to the base 108.

Furthermore, the system 100 includes the I-plate 402 disposed such that the second extension 410 of the I-plate 402 is disposed within the first receiver 114(1) of the first battery module 102(1). In some examples, the second extension 410 of the I-plate 402 is disposed within the receiver 114 such that the second extension 410 abuts (e.g., contacts or engages) the post 112 of the base 108.

In some examples, the system 100 includes a second battery module 102(2) stacked vertically on the first battery module 102(1). The second battery module 102(2) includes a third receiver 114(3) and a fourth receiver 114(4) configured to receive extensions of the I-plates 402 and/or the H-plates within the receivers 114 such that the respective extensions are disposed at least partially within the receivers 114 of the second battery module 102(2). For example, when the system 100 includes the second battery module 102(2) stacked vertically above the first battery module 102(1), the first extension 406 of the I-plate is disposed within a third receiver 114(3) of the second battery module 102(2). Furthermore, in examples where additional battery modules 102 are stacked vertically above the second battery module 102(2), the first extension 406 of the I-plate 402 is disposed within the third receiver 114(3) such that the first extension 406 abuts another I-plate 402.

In some examples, the second battery module 102(2) is disposed such that the housing 104 of the second battery module 102(2) rests at least partially or entirely on crossmembers of respective I-plates 402 and/or H-plates 502. In such a configuration, a weight of the second battery module 102(2) is transferred to the I-plates 402 and/or H-plates 502, which, in turn, transfer the weight to the base 108 via the posts 112 as the extensions of the I-plates 402 and/or H-plates 502 abut the posts 112 of the base 108. Thus, battery modules 102 may be stacked vertically stacked without requiring a lower battery module (e.g., the first battery module 102(1)) to support a weight of an upper battery module (e.g., the second battery module 102(2)). As such, multiple battery modules 102 may be stacked vertically with a weight of such battery modules 102 being carried by the vertically aligned extensions of the I-plates 402 and/or H-plates 502 and the posts 112 that abut one another, thereby transferring the weight to the base 108. Thus, the battery modules 102 may be arranged and supported in any configuration without requiring a traditional "battery rack" to store and secure the battery modules 102.

FIG. 7 depicts a front enlarged view of the system 100 shown and described in FIG. 1. As mentioned previously, the system 100 may include one or more connection plates 116, which includes the I-plate 402 and/or the H-plate 502. The I-plate 402 may be used in the system 100 for end-most connections 120 (shown in FIG. 1), which refers to connections between battery modules 102 proximate a horizontal end 122 (shown in FIG. 1) of the system 100. Furthermore, the H-plate 502 may be used in the system 100 for internal connections 124, wherein "internal connections" refers to connection formed between ends of battery modules 102 or between horizontally adjacent battery modules 102. It is noted that the housing 104 of the battery modules 102 is shown as semi-transparent in order to show the underlying features of the system 100.

When the system 100 includes a second battery module 102(2) stacked vertically on the first battery module 102(1), the first extension 406 of the I-plate 402 is received within the receiver 114 of the upper battery module (e.g., the second battery module 102(2)) and the second extension 410 is received within the receiver 114 of the lower battery module (e.g., the first battery module 102(1)). The housing 104 of the second battery module 102(2) rests on the first (or upper in FIG. 7) side 408 of the crossmember 404 of the I-plate 402. Furthermore, the I-plate 402 may be positioned and/or sized such that a gap 700 is formed between the second (or lower in FIG. 7) side 412 of the crossmember 404 and a top surface 208 of the housing 104 of the first battery module 102(1). As such, a weight of the second battery module 102(2) rests on the I-plate 402 which transfers the weight to the base 108 via the post 112. For example, a surface 702 (lower surface in FIG. 7) of the second extension 410 abuts a surface 703 (upper surface in FIG. 7) of the post 112. Such a configuration is maintained throughout the system 100 in order to carry the weight of the battery modules 102 through the connecting plates 116 and the posts 112 to the base 108 of the system 100, instead of carrying the weight through the battery modules 102 themselves.

Furthermore, when the system 100 includes the second battery module 102(2) stacked vertically above the first battery module 102(1) and a third battery module 102(3) stacked vertically above a fourth battery module 102(4), where the second battery module 102(2) and the third battery module 102(3) are horizontally adjacent (as shown in FIG. 7), the first extension 506 is disposed at least partially within a receiver 114 of the second battery module 102(2), and the second extension 508 is disposed at least partially within a receiver 114 of the third battery module 102(3). Meanwhile, the third extension 514 is disposed at least partially within a receiver of the first battery module 102(1), and the fourth extension 516 is disposed at least partially within a receiver of the fourth battery module 102(4).

Furthermore, the H-plate 502 is positioned and/or sized such that a gap 704 is formed between the second (or lower in FIG. 7) side 518 of the crossmember 504 of the H-plate 502 and a top surface 208 of the housing 104 of the first battery module 102(1) and the fourth battery module 102(4). As such, a weight of the upper battery modules (e.g., the second battery module 102(2) and the third battery module 102(3)) is supported at least in part by the H-plate 502 which transfers the weight to the base 108 via the posts 112 of the base 108. Such a configuration is maintained throughout the system 100 in order to carry the weight of battery modules 102 through the connecting plates 116 and the posts 112 to the base 108 of the system 100, instead of carrying the weight through the battery modules 102 themselves.

By carrying the weight through the connecting plates 116 (e.g., I-plates 402 and H-plates 502), the housing 104 of the battery modules 102 may include a lighter-weight and/or lower strength material relative to the material of the connecting plates 116 which may include a high-strength material. For example, the connecting plates 116 are formed from a material such as steel, while the housing 104 is formed from aluminum. However, it is to be understood that the housing 104 and the connecting plates 116 may be formed from various types of metals and/or alloys including, but not limited to, steel, aluminium, titanium, or other suitable materials.

In some examples, the system 100 may also include a guide 706 disposed at least partially within the receivers 114. The guide 706 may include a component that is inserted at least partially within the receivers 114 and may comprise a metal, polymer, or other material. The guide 706 is shaped to receive an extension of the connecting plate 116 (e.g., I-plate 402 and/or H-plate 502) within the guide 706 and centers the extension of the connecting plate 116 within the receivers 114. The guide 706 centers the extension of the connecting plate 116 such that an aperture (e.g., 414 or 512) in the connecting plate 116 is aligned with an aperture 602 in the receiver 114. In some examples, a fastener 604 is inserted through the aperture 602 in the receiver 114 and engages the aperture (e.g., 414 or 512) in the plate connecting plate 116, thereby securing the extension of the connecting plate 116 within the receiver 114. As such, the connecting plate 116 may be coupled to the receiver 114 via the fastener 604.

The guide 706 may be shaped to press the extension of the connecting plate 116 against a surface of the receiver 114. For example, the guide 706 may press the plate 116 forward such that the extension of the connecting plate 116 contacts an interior surface of the receiver 114. Referring to FIG. 6, the guide 706 may include a biasing member 606 configured to press the extension of the connecting plate 116 against the receiver 114. By pressing the extension of the connecting plate 116 forward to contact an interior surface of the receiver 114, the guide 706 may align the connecting plate 116 and a post 112 such that the extension of the connecting plate 116 abuts the post 112. In some examples, the receiver 114 may include a single guide 706 disposed proximate an end of the receiver 114. When the second extension 410 of the I-plate 402 is inserted into the guide 706 that is disposed within the first receiver 114(1), the guide 706 may also align the first extension 406 of the I-plate within a third receiver 114(3) in a second battery module 102(2) as shown in FIG. 6. However, in some examples, the guide 706 may be omitted and the connecting plates 116 may be sized to tightly fit within the receivers 114. In some examples, the guides 706 assist alignment and fit of the connecting plates 116 within the receivers 114 when tolerances of the connecting plates 116 and/or the receivers 114 varies from component to component.

Furthermore, the guide 706 may include one or more spring arms 708 that are configured to receive an extension of the plates 116 therebetween. The spring arms 708 may exert a force on sides of the extensions, thereby centering or otherwise aligning the extension within the receiver 114. In some examples, the force may be a biasing force and the biasing force of individual spring arms 708 are directed towards each other, thereby securing the extension between the spring arms 708.

While describing the system 100 with respect to the four battery modules (e.g., 102(1), 102(2), 102(3), and 102(4), fewer or more battery modules 102 may be interconnected within the system 100 in a same configuration and manner as shown and described with respect to FIGS. 1-7. As mentioned previously, the system 100 may include any number of battery modules 102 arranged in an m×n configuration, where m is the number of rows and n is the number of columns. In such configurations, the system 100 provides the I-plates 402 and H-plates 502 to engage with the receivers 114 of the battery modules 102 to configure and secure the battery modules within the system 100.

Figure 8:
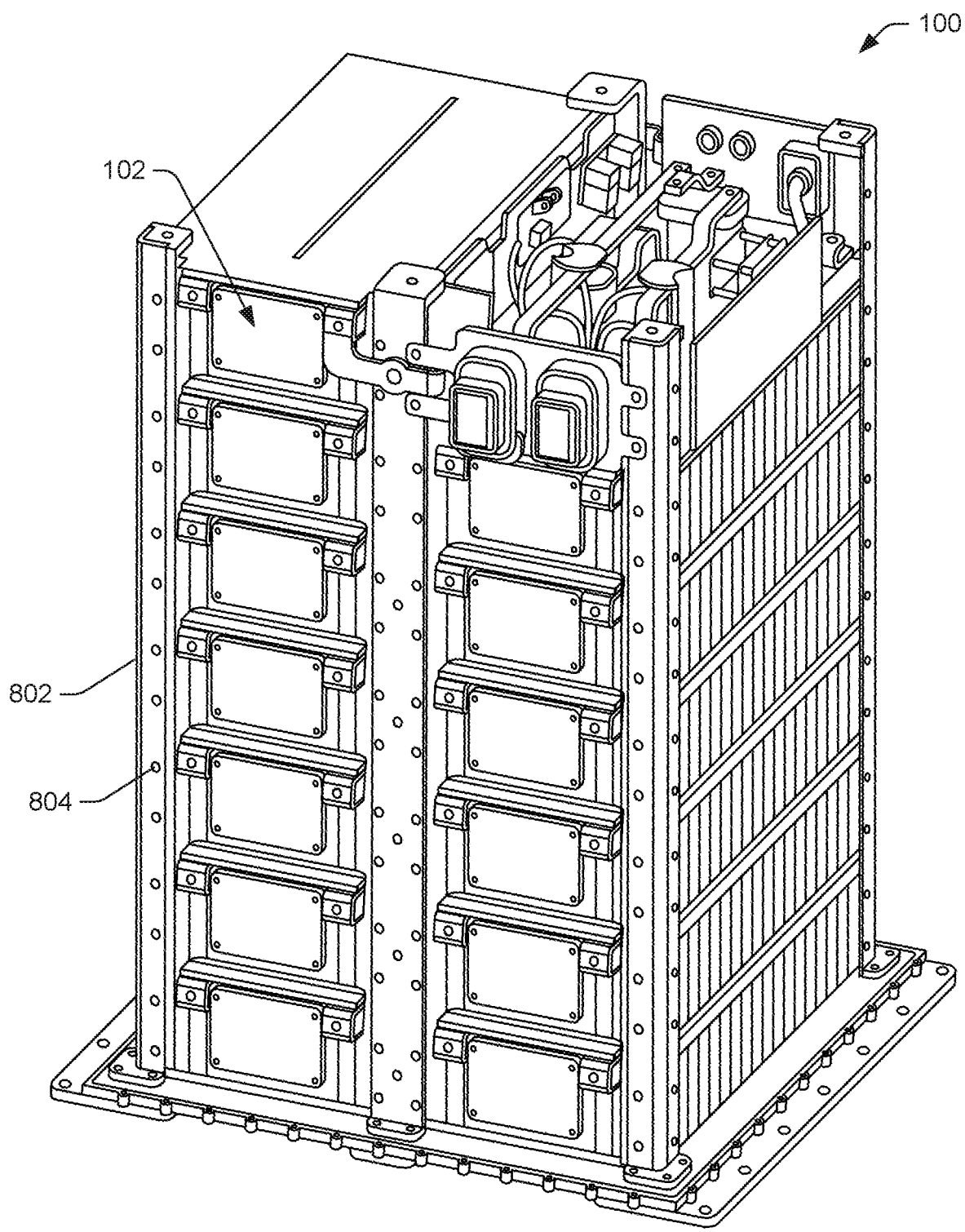
FIG. 8 is a perspective view of the example system for configuring battery modules illustrated in FIG. 1 having vertical braces attached thereto, in accordance with an example of the present disclosure and with certain components removed for clarity.

FIG. 8 depicts a perspective view of the system 100 for configuring the battery modules 102. As shown in FIG. 8, the system 100 includes vertical braces 802 coupled to the system 100. For example, the system 100 includes vertical braces 802 coupled to the base 108 of the system 100 and coupled to the battery modules 102 along a height of the system 100. The vertical braces 802 may be coupled to the housings 104 of individual battery modules 102 along a height of the system 100. In some examples, the vertical braces 802 may be coupled to the system 100 via fasteners 804 (e.g., bolts, rivets, etc.) that are inserted through the apertures 602 in the housings 104 of the battery modules 102 and are secured within the apertures 414 and 512 in the connecting plates 116 of the system 100 and the apertures 304 in the posts 112 of the system, thereby coupling the vertical braces 802 to the battery modules 102, the connecting plates 116, and the posts 112. Furthermore, the vertical braces 802 may be coupled to the base 108 via fasteners 804 that are inserted in the apertures 306 formed in the base 108 of the system 100, thereby coupling the vertical braces 802 to the base 108. In some examples, the vertical braces 802 may be unnecessary in stationary applications of the system 100. However, in mobile applications, or when the system 100 is transported, the vertical braces 802 may be coupled to the system 100, thereby providing additional strength and rigidity allowing the system 100 to withstand forces experienced during transportation or forces associated with mobile applications. In some examples, the vertical braces 802 are comprised of metallic material including, but not limited to, steel, stainless steel, aluminum, or other material.

INDUSTRIAL APPLICABILITY

The present disclosure provides a modular system for configuring battery modules therein. The system may be used in a variety of applications including stationary or mobile applications. The number of battery modules secured within the system varies depending on energy and power requirements, as well as available storage space. The system allows battery modules to be safely stacked vertically while eliminating bulky external structures, which may increase energy density and provide a simplified battery module storage solution. As such, the system is reconfigurable, ensuring that the system is able to meet necessary energy and power input/output requirements as well as ensuring the system fits within available space associated with any application. The system further offloads a weight of vertically stacked battery modules from the battery modules themselves by carrying the weight through a series of rigid, mating plates. As such, battery modules are stackable without concern for crushing or otherwise damaging the battery modules.

According to some embodiments, the system 100 includes battery modules 102 that include housings 104 with receivers 114 formed in the housings 104 of the battery modules 102. The battery modules 102 are stackable on a base 108 of the system 100, and the receivers 114 receive posts 112 of the base 108 therein. Battery modules are stacked vertically above each other where extensions of connecting plates 116 are disposed within the receivers 114 and are arranged to carry the weight of the battery modules 102 through the connecting plates 116 to the posts 112 of the base 108. The system 100 optionally includes vertical braces 802 that are coupled to the system 100 for transportation or mobile applications. As such, the system 100 provides a modular battery module 102 storage "rack" that eliminates a need for bulky external structures associated with traditional battery racks. Additionally, due to the configuration of the system 100 the battery modules 102 do are stackable without concern for crushing or otherwise damaging the battery modules.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:
1. A system, comprising:
a base having a surface;
a post coupled to the base and extending in a first direction that is transverse to the surface of the base; and
a battery module having a housing supported by the base and defining an internal space, the housing being configured to secure one or more battery cells within the internal space, the housing including:
an end plate extending in the first direction, and
a receiver formed in the end plate and defining a hollow portion in the end plate, wherein the post:

includes an end disposed within the hollow portion of the receiver, and is coupled to the receiver, a plate having a crossmember, a first extension extending from a first side of the crossmember, and a second extension extending from a second side of the crossmember opposite the first side, wherein:

the first extension is disposed such that a lower surface of the first extension abuts the end of the post within the hollow portion of the receiver.

2. The system of claim 1, further comprising wherein, the first side of the crossmember extends substantially perpendicular to an axis of the first extension, and is spaced apart from a top surface of the receiver so as to form a gap between the first side of the crossmember and the top surface of the receiver, the end of the post comprises a vertically uppermost end of the post, and the crossmember and the second extension are disposed external to the receiver.

3. The system of claim 2, further comprising a guide disposed at least partially within the receiver, the guide including one or more spring arms that exert a force on the first extension, thereby centering the first extension of the plate within the receiver.

4. The system of claim 2, wherein:

the plate is coupled to the end plate of the housing via a first fastener in contact with the first extension, and the post is coupled to the end plate via a second fastener extending through an aperture of the receiver.

5. The system of claim 2, wherein the battery module is a first battery module, the receiver is a first receiver, the housing is a first housing, and the system further comprises a second battery module disposed vertically above the first battery module, the second battery module having a second housing including a second receiver, wherein;

the second extension is disposed at least partially within the second receiver such that the second housing is disposed in contact with the crossmember of the plate, the crossmember of the plate supports a weight of the second housing, and the plate directs a force of the weight of the second housing to the base via abutting contact between the first extension and the end of the post.

6. The system of claim 1, wherein:

the end plate is a first end plate, the receiver is a first receiver, the hollow portion is a first hollow portion, the post is a first post, and the system further comprises a second post coupled to the base and extending in the direction, and the housing further includes:

a second end plate opposite the first end plate, and a second receiver formed in the second end plate and defining a second hollow portion, an end of the second post being disposed within the second hollow portion, and the second post being coupled to the second end plate via a fastener extending through an aperture formed by the second receiver.

7. The system of claim 6, wherein the housing further includes:

a first side plate coupled to the first end plate and the second end plate, thereby defining a first side of the housing, the first side plate extending substantially perpendicular to the first end plate and the second end plate; and a second side plate coupled to the first end plate and the second end plate, thereby defining a second side of the housing opposite the first side, the second side plate extending substantially parallel to the first side plate.

8. The system of claim 1, wherein the post is a first post of a plurality of posts extending from the base in the first direction, the receiver is a first receiver, and the battery module includes a second receiver formed in the end plate, wherein:

an end of a second post of the plurality of posts is disposed within a hollow portion defined by the second receiver, and the second post is coupled to the second receiver via a fastener.

9. The system of claim 8, wherein:

the first receiver and the second receiver are formed integrally with the end plate, the system comprises a first plate, of a first type, including a first extension disposed at least partially within the first receiver, a surface of the first extension abutting the end of the first post within the first receiver, and the system further comprises a second plate, of a second type different from the first type, including a second extension, a surface of the second extension abutting the end of the second post within the second receiver.

10. A system, comprising:

a first battery module having a first housing that includes:

a first end plate, a first receiver disposed proximate the first end plate, and a second receiver disposed proximate the first end plate;

a second battery module disposed vertically above the first battery module, the second battery module having a second housing that includes:

a second end plate defining an end of the second housing, a third receiver disposed proximate the second end plate, and a fourth receiver disposed proximate the second end plate;

a first plate having a first crossmember, a first extension extending from a first side of the first crossmember, and a second extension extending from a second side of the first crossmember, the first extension of the first plate being disposed at least partially within the third receiver and the second extension of the first plate being disposed at least partially within the first receiver;

a second plate having a second crossmember, a first extension extending from a first side of the second crossmember, and a second extension extending from a second side of the second crossmember, the first extension of the second plate is disposed at least partially within the fourth receiver and the second extension of the second plate being disposed at least partially within the second receiver such that the second housing is supported at least partially by the first crossmember of the first plate and the second crossmember of the second plate.

11. The system of claim 10, further comprising a base with a first post and a second post extending from the base in a direction that is transverse to a surface of the base, wherein the first post includes a first end disposed within the first receiver of the first end plate such that the first end of the first post abuts the first plate within the first receiver, and the second post includes a second end disposed within the second receiver of the first end plate such that the second end of the second post abuts the second plate within the second receiver.

12. The system of claim 11, wherein at least a portion of a force of a weight of the second battery module is transferred to the first post and the second post via the first plate and the second plate, respectively.

13. The system of claim 11, further comprising a brace coupled to the base, the first housing, and the second housing.

14. The system of claim 10, further comprising a first guide disposed at least partially within the first receiver and a second guide disposed at least partially within the second receiver, wherein the first guide centers the first plate within the first receiver of the first end plate and the second guide centers the second plate within the second receiver of the first end plate.

15. A method of configuring a battery module system, the method comprising:
   providing a base having a plurality of vertically extending posts;
   providing a battery module that includes a housing having an end plate with a vertically extending receiver formed in the end plate, the receiver defining a hollow portion; and
   securing the battery module to the base such that:
   an end of the post is disposed within the hollow portion of the receiver, and
   the post is coupled to the receiver via a fastener extending through an aperture formed by the receiver,
   providing a plate having crossmember, a first extension extending from a first side of the crossmember, and a second extension extending from a second side of the crossmember opposite the first side, wherein:
   the first extension is disposed such that a lower surface of the first extension abuts the end of the post within the hollow portion of the receiver.

16. The method of claim 15, further comprising:
   the first side of the crossmember extending substantially perpendicular to the first extension and spaced apart from a top surface of the receiver forming a gap between the first side of the crossmember and the top surface of the receiver, and
   the crossmember and the second extension are disposed external to the receiver; and securing the first extension of the plate within the hollow portion of the receiver.

17. The method of claim 16, further comprising inserting a guide at least partially within the receiver, the guide including one or more spring arms that exert a force on the first extension, thereby centering the first extension of the plate within the receiver.

18. The method of claim 16, wherein the battery module is a first battery module, the receiver is a first receiver, the housing is a first housing, and the method further comprises:
   providing a second battery module disposed vertically above the first battery module, the second battery module having a second housing including a second receiver, wherein the second extension is disposed at least partially within the second receiver such that the second housing is disposed in contact with the crossmember of the plate.

19. The method of claim 16, wherein the plate further includes a third extension extending from the first side of the crossmember and a fourth extension extending from the second side of the crossmember, the third extension is parallel to and spaced apart from the first extension, and the fourth extension is parallel to and spaced apart from the second extension.

20. The method of claim 15, wherein the post is a first post of a plurality of posts extending from the base in the first direction, the receiver is a first receiver, and the battery module includes a second receiver formed in the end plate, wherein a second post of the plurality of posts is disposed at least partially within a hollow portion defined by the second receiver and is coupled to the second receiver.

* * * * *